Sept. 24, 1946.                V. E. SPROUSE                2,408,347
                WORM ADJUSTING DOUBLE WRAP HOSE CLAMP
                Filed July 19, 1944            2 Sheets-Sheet 1
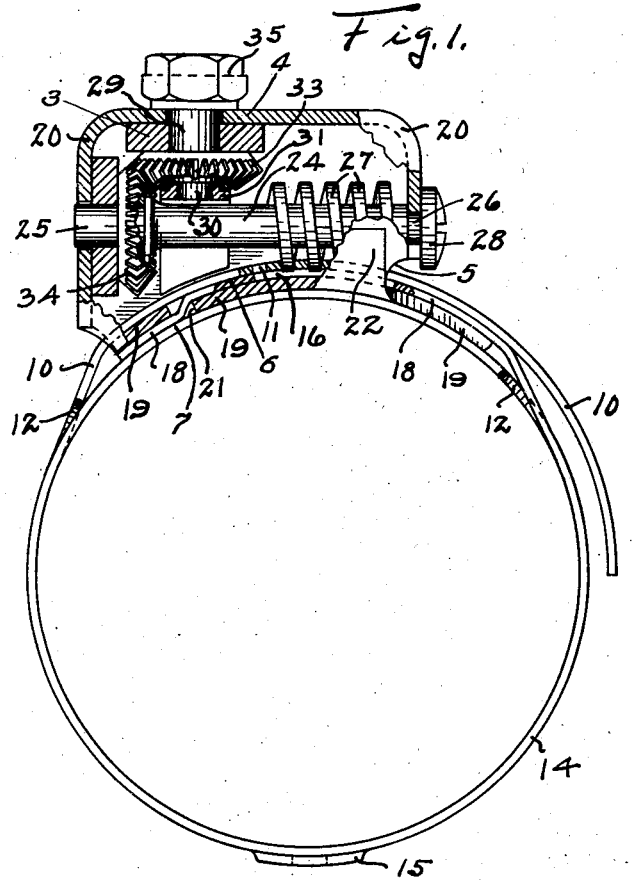
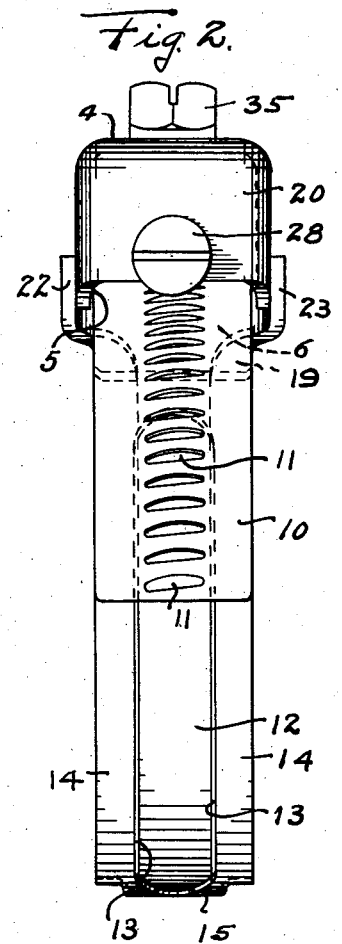
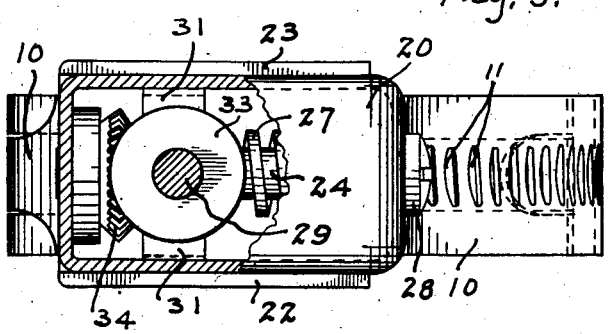
INVENTOR,
Verner E. Sprouse,
By Herbert A. Minturn,
Attorney.

Sept. 24, 1946.   V. E. SPROUSE   2,408,347
WORM ADJUSTING DOUBLE WRAP HOSE CLAMP
Filed July 19, 1944   2 Sheets-Sheet 2
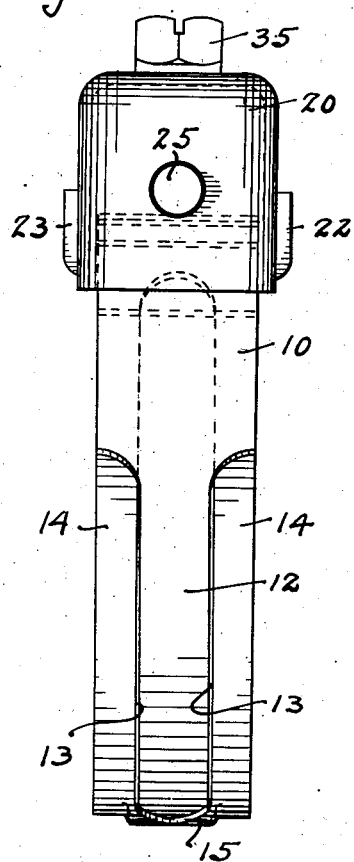
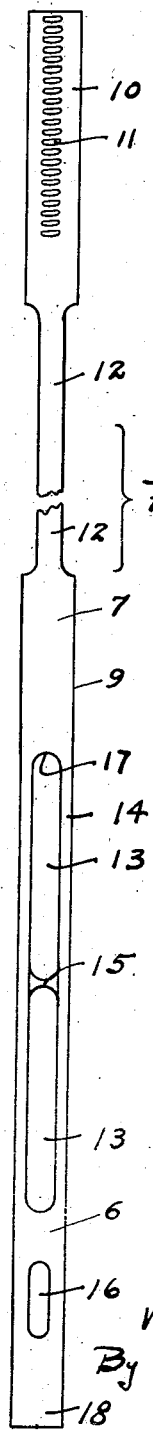
INVENTOR,
Verner E. Sprouse,
By Herbert A. Minturn,
Attorney.

Patented Sept. 24, 1946

2,408,347

UNITED STATES PATENT OFFICE 2,408,347

WORM ADJUSTING DOUBLE WRAP HOSE CLAMP

Verner E. Sprouse, Columbus, Ind.

Application July 19, 1944, Serial No. 545,559

4 Claims. (Cl. 24—19)

This invention relates to a hose clamp of a double wrap type with a worm screw for drawing it into a smaller effective diameter.

The primary objects of the invention are to eliminate extrusion of hose rubber through the slots provided in the heretofore worm screw type clamp; to eliminate a fixed radius bearing member on the hose and to put the entire band parts which touch the hose in tension; to eliminate any tongue part under compression; and to reduce the tendency of backing off of the worm screw under vibration particularly such as is encountered in aeronautical conditions.

These and other objects and advantages of the invention will become apparent to those versed in the art in the following description of one particular form of the invention as illustrated in the accompanying drawings, in which Fig. 1 is a view in side elevation in partial section of a structure embodying the invention;

Fig. 2, a view in tongue end elevation;

Fig. 3, a top plan view in partial section;

Fig. 4, a view in back elevation; and

Fig. 5, a developed view of the band used to form the clamp.

Like characters of reference indicate like parts throughout the several views in the drawings.

Referring first to Fig. 5, a length of strap metal 9 is formed to the shape as indicated wherein there is a tongue portion 10 having a plurality of slots or abutments 11 therethrough which will serve to receive the thread of the worm screw as will later become more apparent. As indicated by the drawings, the tongue 10 is made to be the full width of the strap 9 but immediately back of the tongue 10 there is a reduced width portion 12 which is provided to enter through the slot 13 of a widened portion 14 at the other end of the blank or strap 9. Where the diameter of the clamp is to be rather large, such as above two inches, it is preferable to employ a tie 15 across the slot 13 in order to prevent displacement of the narrow length 12 particularly in shipping, storage, and during the application of the clamp to the hose. Then toward the end 18 of the blank 9 removed from the tongue end is a short slot 16 which is provided for worm screw thread clearance and which will be located in the formed clamp under the slots 11.

The strap 9, as shown in Fig. 5, is wrapped around into circular form as indicated in the other views of the drawings to have the reduced width portion 12 rest over the tie 15 within the slot 13 and have the tongue end 10 pass through the slot 13 outwardly and over the strap 9 with the other end 18 of the band carried thereunder. This wrapping and general design of the clamp strap with exception of its ends conforms to the disclosure of the strap in my Patent No. 2,363,206, for hose clamps. The end 18 is carried up over the floor 19 of a bracket generally designated by the numeral 20, and inside of the bracket and then down through a slot 21 and turned around under the remaining portion of the floor 19 extending to the left, whereby the end 18 of the band is bent through that slot 21 to form an abutment therewith. That band end 18 may also be spot welded to the floor 19 if so desired to secure the necessary attachment strength. The floor 19 of the bracket 20 rests on top of the outside of that part of the band which appears under the band end 18, both the floor 19 and the end 18 being free to travel circumferentially. The part 7 of the band 9 under the end 18 and the bracket floor 19 is that part of the band which has a full width and lies between the inner end of the tongue 10 and the beginning of the narrow portion 12 at the other end of the slot 13 removed from the end of the slot 13 from which the tongue 10 emerges. The tongue 10 enters the bracket 20 from the left side, Fig. 1, through an opening adjacent the floor 19 and is wrapped around slidingly thereover and over that part of the band which is carried on the top side of the floor 19, this part 6 being the one which carries the slot 16. The tongue extends on through the bracket 20 through an opening 5 at its under right hand side above the floor 19 to extend freely over the other part of the band thereunder.

The floor 19 of the bracket 20 has upturned sides 22 and 23, Fig. 2, between which the upper part of the bracket 20 fits and is secured in any suitable manner, such as by welding or brazing. A worm screw 24 is carried by the bracket 20 by bearing portions 25 and 26 to have the thread 27 engage with the slots 11 of the tongue 10. The slot 16 appears immediately under these threads 27 and under the tongue 10 in order to provide sufficient clearance for the threads as they may extend through the thickness of the tongue 10. The right hand end of the worm screw 24 is provided with a slotted head 28 whereby the screw 24 may be rotated by means of a screwdriver in order to advance the tongue 10 circumferentially around through the housing 20 and thus reduce the effective diameter of the clamp itself.

Under some conditions, the hose clamp may have to be located in such a position that the screw head 28 is not positioned properly to be reached, and in order to provide for that contingency, the bracket 20 is provided with a stub shaft 29 entering from the top side 4 through a bearing 3 provided by the bracket and having a lower bearing 30 carried in a cross bracket 31 within the bracket 20. The shaft 29 carries a bevel gear 33 within the bracket 20 which is in constant mesh with a bevel gear 34 fixed to the shaft of the worm screw 24 adjacent the bearing 25. The external end of the stub shaft 29 is provided with a head 35 herein shown as both slotted and hexagon in shape in order to permit its being turned either by a wrench or by a screwdriver.

Since the end 18 is anchored to the bracket 20, and the floor 19 of the bracket 20 rests on top of a part of the hose clamp band and cannot come into contact with the hose itself, the band itself may conform to all of the irregularities and differences in wall thicknesses of the hose being clamped, and all of the band is placed under tension without any part thereof being under compression, such as has heretofore been the case in many other designs of the prior art where a bearing plate is provided with a fixed radius to rest directly upon the hose. Also since the clamp wraps twice around the hose, it has twice the mechanical advantage with more pressure exerted on the hose under reduced torque in the worm screw, all of which means that under vibration conditions, there is much less possibility of the worm screw 24 backing up to release pressure on the hose.

Thus, it is to be seen that the invention provides a hose clamp wherein the encircling band is entirely under tension without any portion thereof being under compression, and further, the band is so designed that even though the worm screw mechanism is employed, there are no holes through which the hose may extrude to cause not only damage to the hose but to resist further takeup of the clamp.

While I have herein shown and described my invention in the one form as now best known to me, it is obvious that structural variations may be employed, particularly in the design of the bracket 20, all without departing from the spirit of the invention, and I, therefore, do not desire to be limited to that precise form as shown and described beyond the limitations as may be imposed by the following claims.

I claim:

1. A hose clamp comprising a hose wrapping band circumferentially wrapped to extend twice around the hose, the band having overlapping ends; one of said ends being provided with a series of abutments therealong; a bracket to which the other of said band ends is secured; said bracket having a member circumferentially riding on said band spaced between said ends; said one end extending over said bracket member; and a worm rotatably carried by the bracket and having a thread engaging said end abutments for pulling the entire band under tension between said ends to reduce its effective diameter.

2. A hose clamp comprising a hose wrapping band circumferentially wrapped to extend twice around the hose, the band having overlapping ends; one of said ends being provided with a series of abutments therealong; a bracket to which the other of said band ends is secured; said bracket having a member circumferentially riding on said band spaced between said ends; said one end extending over said bracket member; and a worm rotatably carried by the bracket and having a thread engaging said end abutments for pulling the entire band under tension between said ends to reduce its effective diameter; said other band end extending over said bracket member under said one end to provide a sliding surface for circumferential travel therebetween, and down through an opening in said bracket member and along thereunder to ride against said band.

3. A hose clamp comprising a hose wrapping band circumferentially wrapped to extend twice around the hose, the band having overlapping ends; one of said ends being provided with a series of abutments therealong; a bracket to which the other of said band ends is secured; said bracket having a member circumferentially riding on said band spaced between said ends; said one end extending over said bracket member; and a worm rotatably carried by the bracket and having a thread engaging said end abutments for pulling the entire band under tension between said ends to reduce its effective diameter; and means carried by said bracket having an operating member angularly disposed from the axis of said worm thread for revolving the worm.

4. A hose clamp comprising a hose wrapping band circumferentially wrapped to extend twice around the hose, the band having overlapping ends; one of said ends being provided with a series of abutments therealong; a bracket to which the other of said band ends is secured; said bracket having a member circumferentially riding on said band spaced between said ends; said one end extending over said bracket member; and a worm rotatably carried by the bracket and having a thread engaging said end abutments for pulling the entire band under tension between said ends to reduce its effective diameter; and means carried by said bracket having an operating member angularly disposed from the axis of said worm thread for revolving the worm; said bracket carried means comprising a gear system interconnecting said worm and said operating member; the axis of said worm thread being substantially parallel to a tangent to said wrapped band; and said operating member extending externally of said bracket and having its axis substantially normal to that of the worm thread; said gear system consisting of a gear fixed to said worm, and a second gear meshed with the first gear and fixed to said operating member; said operating member having a bearing in an outer portion of said bracket outside of its attached gear; and a crossbar within said bracket carrying an inner end of said operating member.

VERNER E. SPROUSE.